(12) United States Patent
Chen

(10) Patent No.: US 7,086,734 B2
(45) Date of Patent: Aug. 8, 2006

(54) POSITION-ADJUSTABLE LENS AND NOSE-PAD ASSEMBLY

(75) Inventor: Chih-Lung Chen, Tainan (TW)

(73) Assignee: High Rainbow Ent. Co., Ltd., Tainan (TW)

( * ) Notice: Subject to any disclaimer, the term of this patent is extended or adjusted under 35 U.S.C. 154(b) by 0 days.

(21) Appl. No.: 11/010,362

(22) Filed: Dec. 14, 2004

(65) Prior Publication Data

US 2006/0126009 A1  Jun. 15, 2006

(51) Int. Cl.
*G02C 5/12* (2006.01)
(52) U.S. Cl. ........................ 351/137; 351/138
(58) Field of Classification Search ........ 351/136–138, 351/78–80
See application file for complete search history.

(56) References Cited

U.S. PATENT DOCUMENTS

| 5,035,498 | A | * | 7/1991 | Bolle Robert | ............. 351/116 |
| 5,659,381 | A | * | 8/1997 | Simioni | ..................... 351/120 |
| 6,386,705 | B1 | * | 5/2002 | Chen | ......................... 351/138 |

* cited by examiner

*Primary Examiner*—Huy Mai
(74) *Attorney, Agent, or Firm*—Rosenberg, Klein & Lee

(57) ABSTRACT

A position-adjustable lens and nose-pad assembly includes a nose-pad and a lens. The nose-pad is provided with an upper mounting rod and a lower mounting rod, and a hollow is formed between the upper mounting rod and the lower mounting rod. The lens is provided with an upper concave and a lower concave, the upper concave and the lower concave are respectively provided with successive through holes, and a flanged portion is formed between the upper concave and the lower concave.

4 Claims, 9 Drawing Sheets

AA-VIEW

BB-VIEW

POSITION-ADJUSTABLE LENS AND NOSE-PAD ASSEMBLY

BACKGROUND OF THE INVENTION

Field of the Invention

The present invention relates to a lens and nose-pad assembly with innovatory convenience and comfort features, and more particularly to a lens and nose-pad assembly that can be easily assembled and can be adjusted to proper positions to fit different sized noses of wearers and let them feel comfortable.

Description of the Related Art

A conventional lens and nose-pad assembly is known in the art of U. S. Pat. No. 6,386,705, to Chih-Lung Chen, the inventor of the present invention. The prior assembly, referring to FIG. 1, includes a nose-pad 1 and a lens 2.

The nose-pad 1 made of soft rubber is provided with a pair of inserting portions respectively on the left and right sides. Each inserting portion has a mounting rod 11 or 11' on the front, a hollow 12 or 12' in the center and a dented curve 13 or 13' provided on the rear surface.

The lens 2 has a nose-pad cutout portion in the bottom edge. The cutout portion is provided with a lateral concave 21 or 21' in the upper section of each side and a barb 23 or 23' in the middle of each side. A protruding block 22 or 22' is formed between each lateral concave 21 or 21' and each barb 23 or 23' on each side of the cutout portion.

While being assembled, referring to FIGS. 2 and 3, each protruding block 22 or 22' is inserted into each hollow 12 or 12' of the inserting portion so as for each mounting rod 11 or 11' to be firmly secured to each side of the cutout portion with both ends of each mounting rod 11 or 11' respectively inlaid in each lateral concave 21 or 21' and barb 23 or 23'.

However, there are drawbacks in the above-mentioned conventional nose-pad assembly. After being used for a period of time, the nose-pads 1 made of soft rubber will be easily transformed by heat and lose elasticity, and the dented curves will be accumulated by dust. Besides, the conventional nose-pad assembly is designed for a wearer with a bigger nose, and it can not fit different sized noses of wearers.

SUMMARY OF THE INVENTION

Therefore, the present invention is to provide a position-adjustable lens and nose-pad assembly that substantially obviates the drawbacks of the conventional art.

An objective of the present invention is to provide a lens and nose-pad assembly which is easier to be assembled and saves cost.

Another objective of the present invention is to provide a lens and nose-pad assembly which can be adjusted to proper positions to fit different sized noses of wearers and let them feel comfortable.

Accordingly, a position-adjustable lens and nose-pad assembly in the present invention includes a nose-pad and a lens. The nose-pad is provided with an upper mounting rod and a lower mounting rod, and a hollow is formed between the upper mounting rod and the lower mounting rod. The lens is provided with an upper concave and a lower concave, the upper concave and the lower concave are respectively provided with successive through holes, and a flanged portion is formed between the upper concave and the lower concave.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
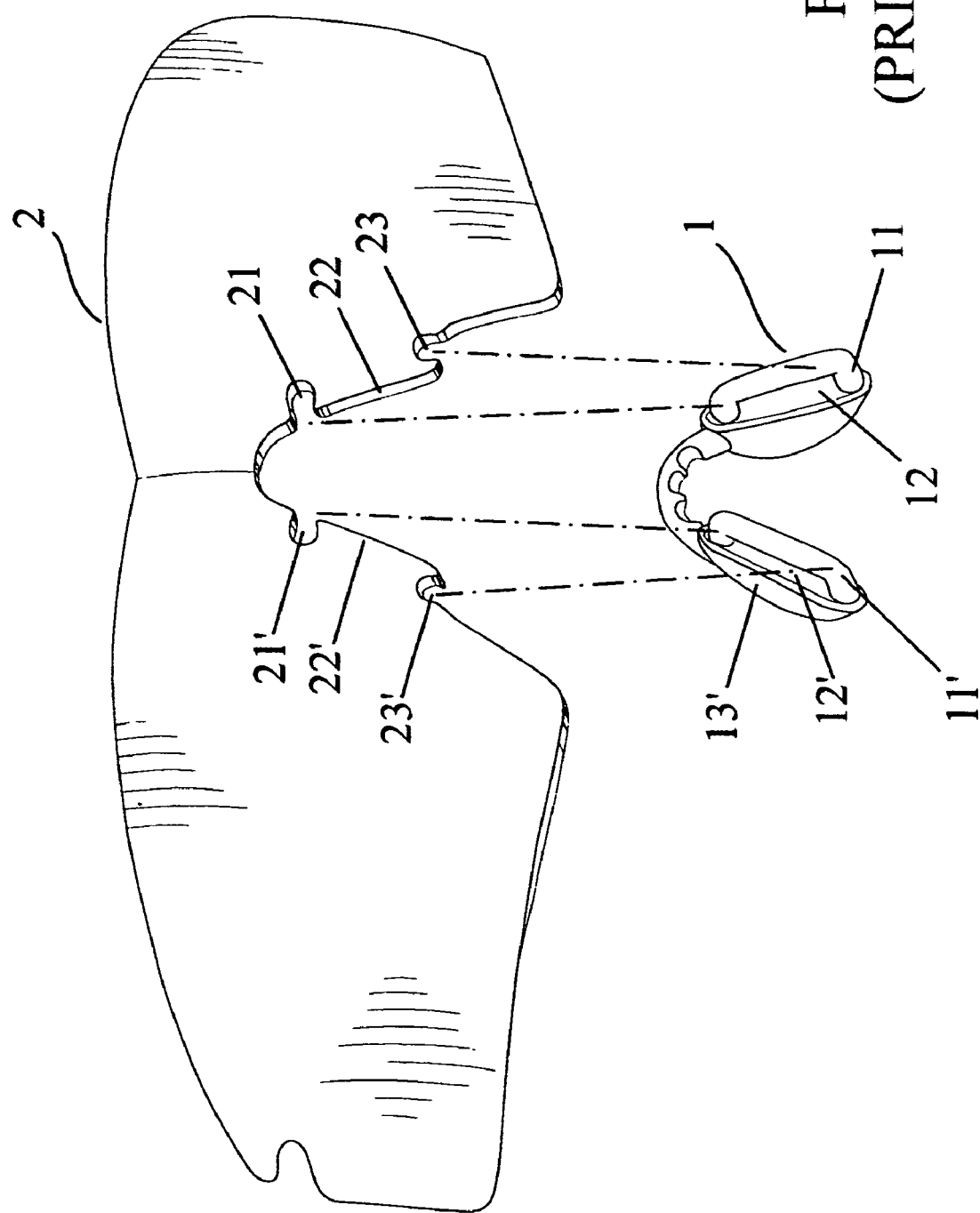
FIG. 1 is a perspective exploded view of a conventional lens and nose-pad assembly.
Figure 2:
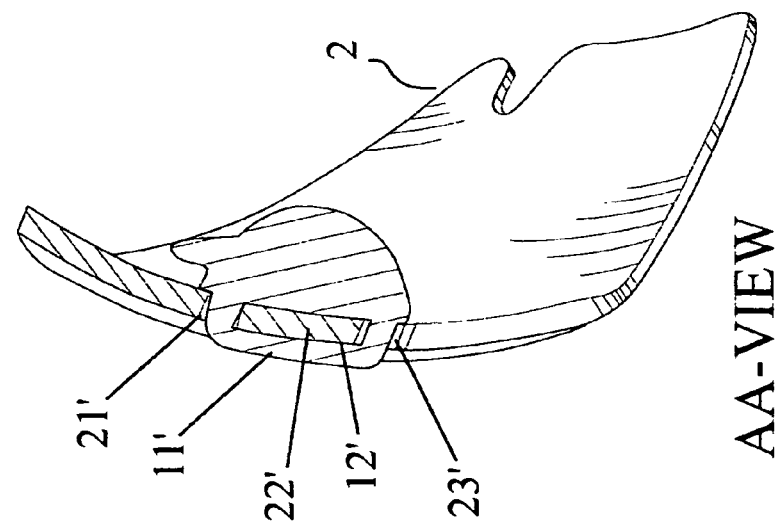
FIG. 2 is a front view of a conventional lens and nose-pad assembly in an assembled configuration and a cross sectional view taken along line A—A.
Figure 2:
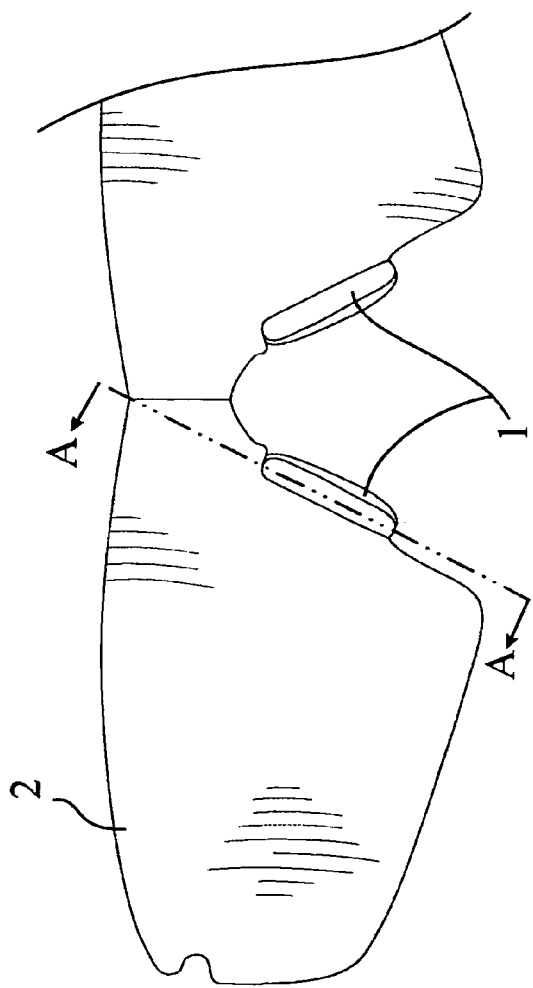
Figure 3:
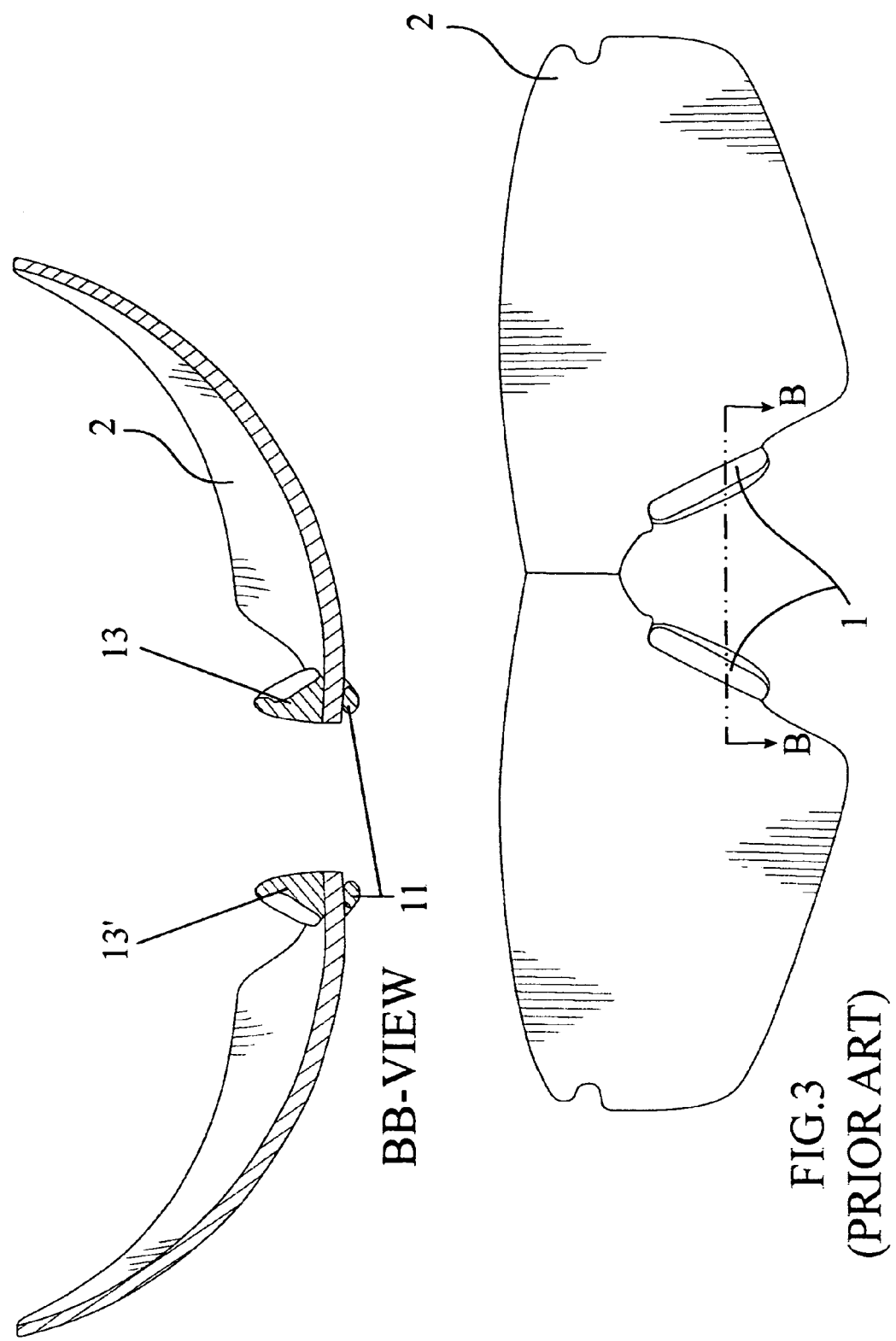
FIG. 3 is a front view of a conventional lens and nose-pad assembly in an assembled configuration and a cross sectional view taken along line B—B.
Figure 4:
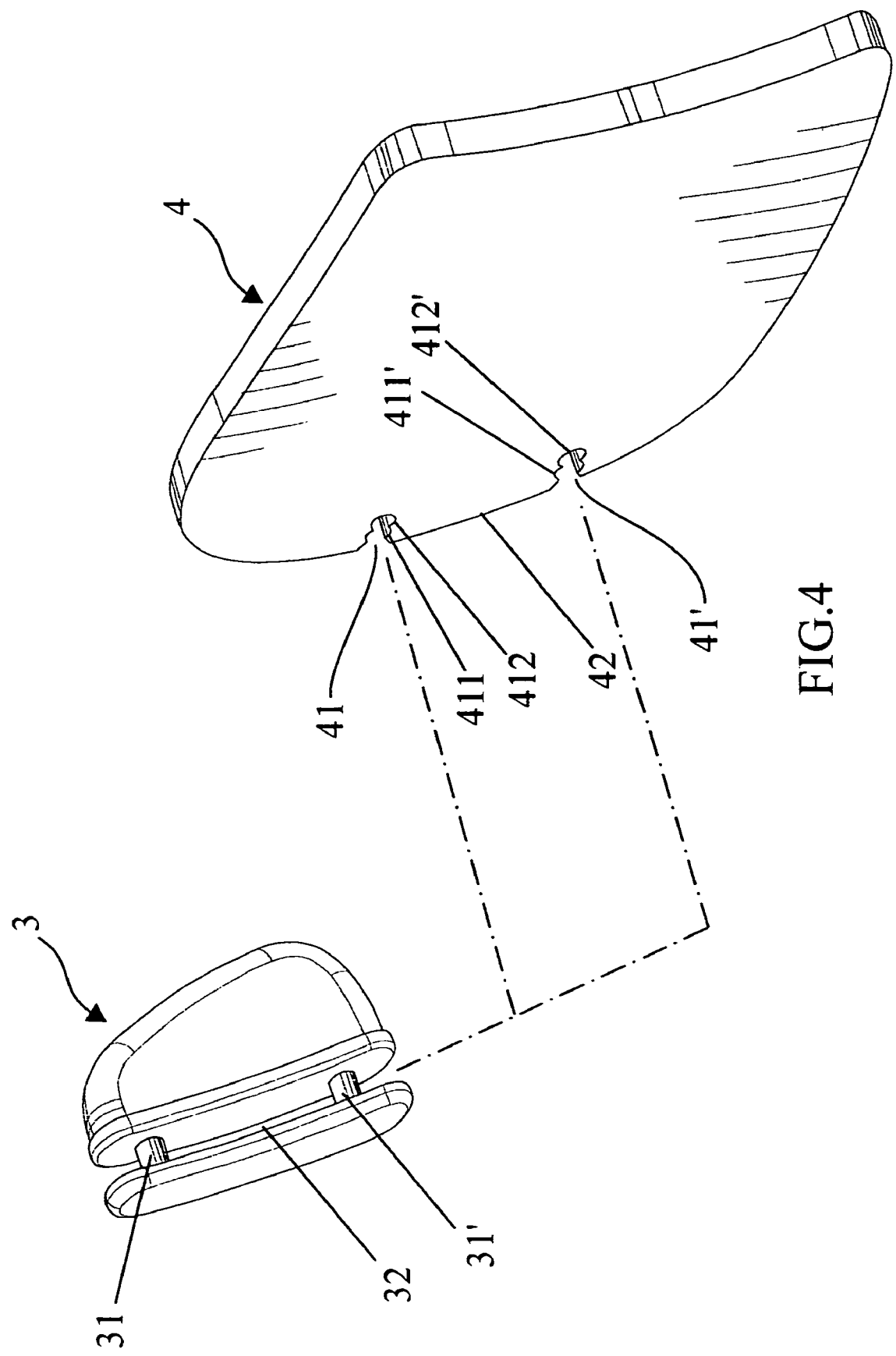
FIG. 4 is a perspective exploded view of an embodiment of the position-adjustable lens and nose-pad assembly in accordance with the present invention.

Referring to FIG. 4, a position-adjustable lens and nose-pad assembly in the present invention includes a nose-pad 3 and a lens 4.

The nose-pad 3 is provided with an upper mounting rod 31 and a lower mounting rod 31', and a hollow 32 is formed between the upper mounting rod 31 and the lower mounting rod 31'. The lens 4 is provided with an upper concave 41 and a lower concave 41', the upper concave 41 and the lower concave 41' are respectively provided with successive first and second through holes 411, 412, 411' and 412', and a flanged portion 42 is formed between the upper concave 41 and the lower concave 41'.

Figure 6:
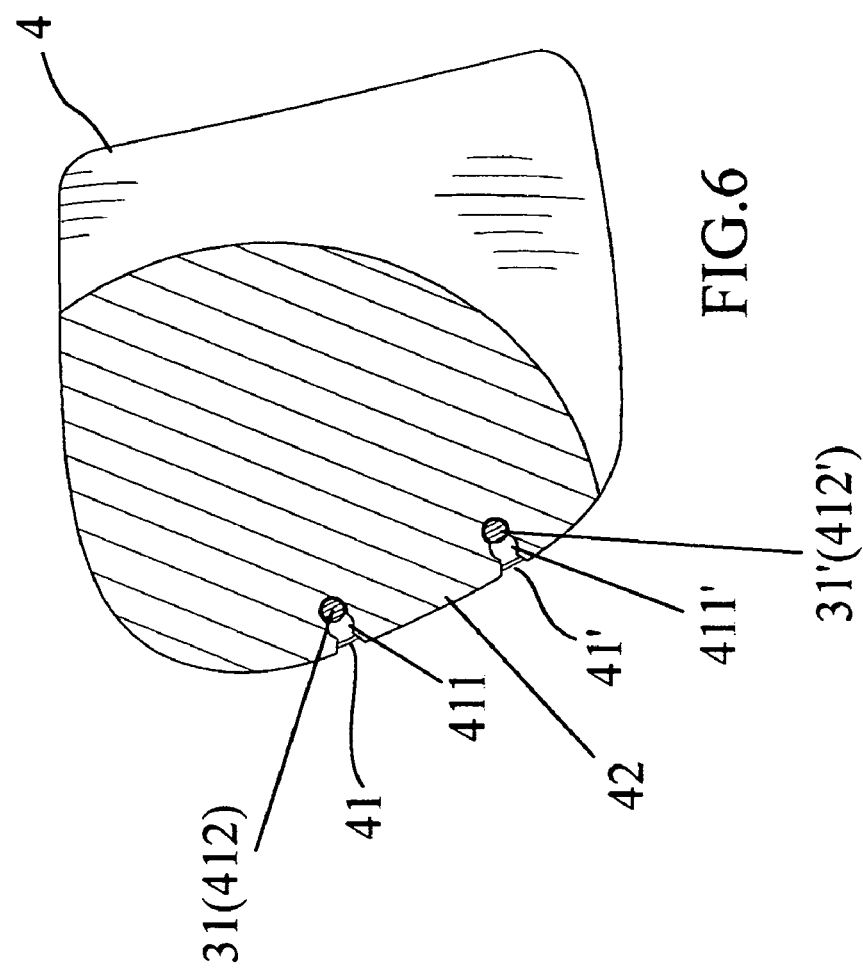
FIG. 6 is a cross sectional view taken along line A—A in FIG. 5.
Figure 5:
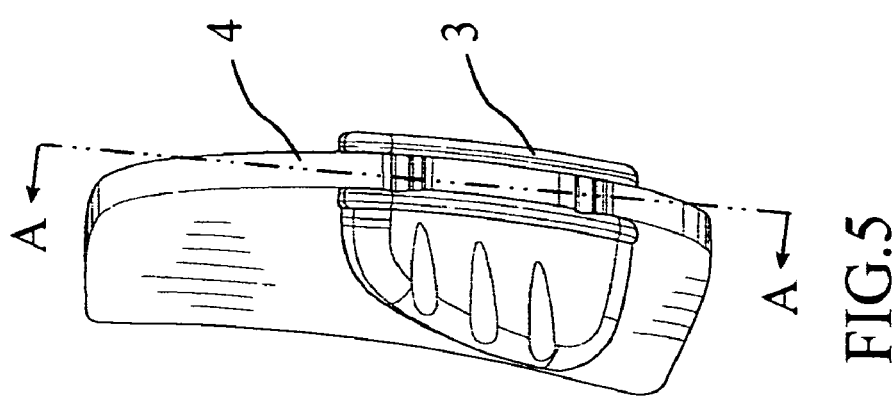
FIG. 5 is a side view of an embodiment of the position-adjustable lens and nose-pad assembly in an assembled configuration in accordance with the present invention.

While being assembled, referring to FIGS. 5 and 6, the hollow 32 of the nose-pad 3 is sleeved on the flanged portion 42 of the lens 4, and the upper mounting rod 31 and the lower mounting rod 31' of the nose-pad 3 are respectively inserted in the upper concave 41 and the lower concave 41' of the lens 4, so as for the nose-pad 3 to be firmly secured to the lens 4.

Figure 7:
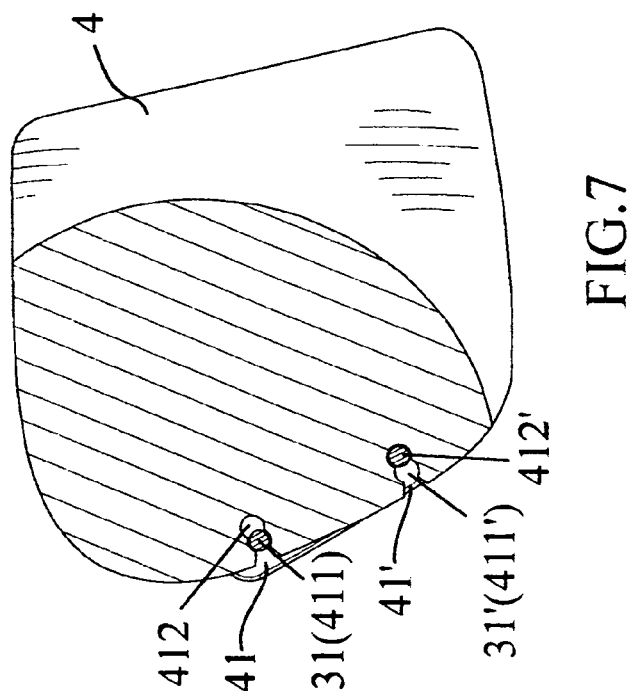
FIG. 7 is a schematic cross sectional view of an embodiment of the position-adjustable lens and nose-pad assembly in accordance with the present invention showing the nose-pad being position-adjusted.

The position of the nose-pad 3 can be adjusted according to the size of a wearer's nose. If a wearer's nose is bigger, the upper mounting rod 31 of the nose-pad 3 may be inserted in the first through hole 411 or the second through hole 412 of the upper concave 41, and then the lower mounting rod 31' is inserted in the second through hole 412' of the lower concave 41', as shown in FIG. 7.

Figure 8:
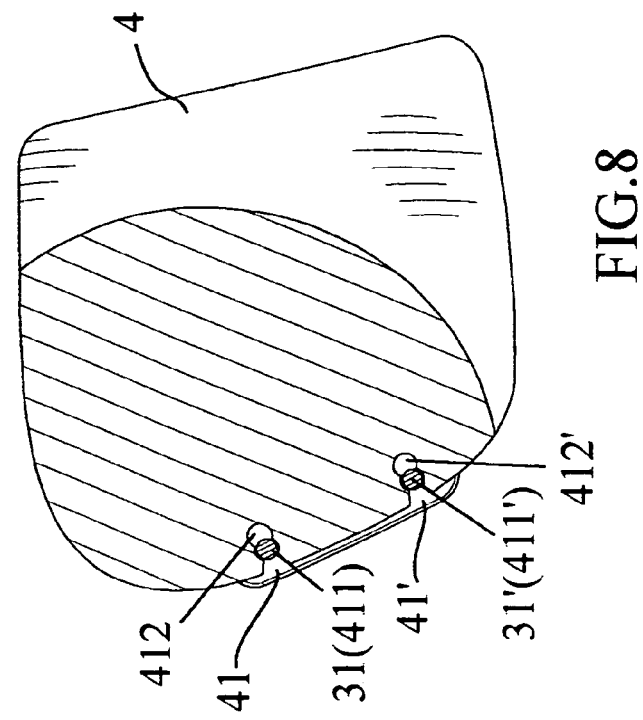
FIG. 8 is another schematic cross sectional view of an embodiment of the position-adjustable lens and nose-pad assembly in accordance with the present invention showing the nose-pad being position-adjusted.
Figure 9:
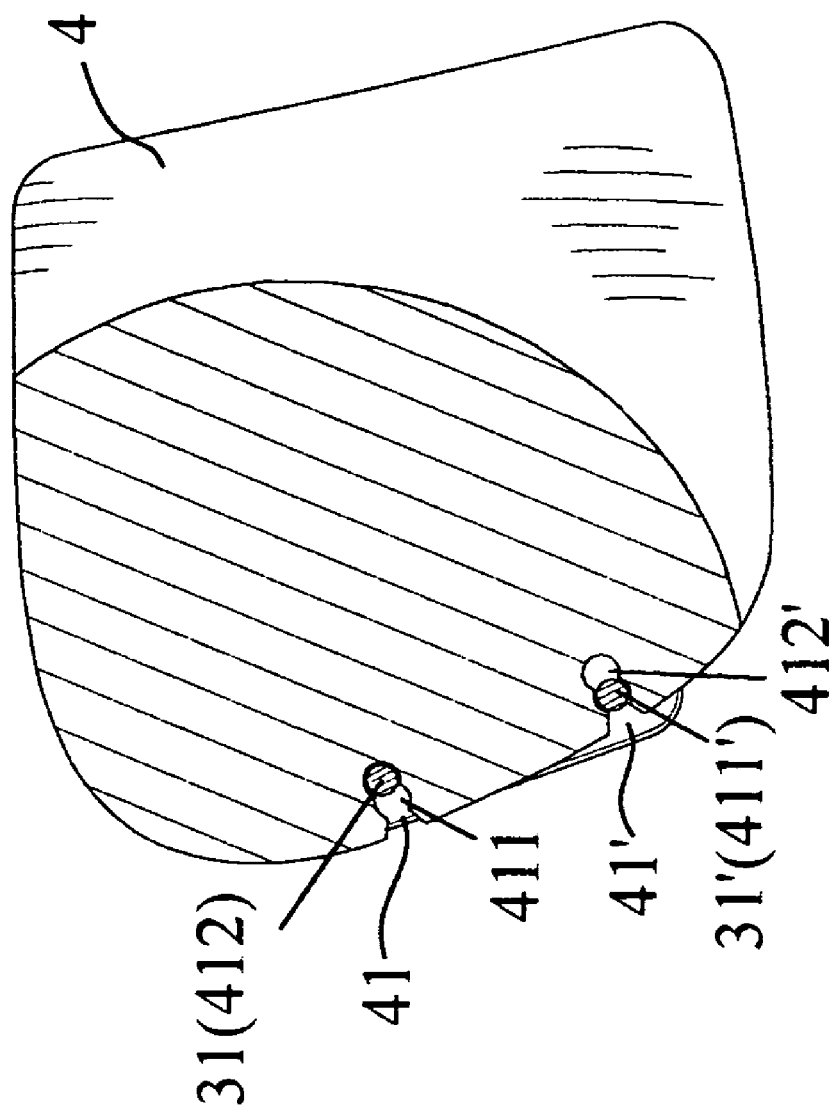
FIG. 9 is a further schematic cross sectional view of an embodiment of the position-adjustable lens and nose-pad assembly in accordance with the present invention showing the nose-pad being position-adjusted.

On the contrary, If a wearer's nose is smaller, the upper mounting rod 31 of the nose-pad 3 may be inserted in the first through hole 411 of the upper concave 41, and then the lower mounting rod 31' is inserted in the first through hole 411' of the lower concave 41', as shown in FIG. 8. If a wearer has a medium size of nose, the upper mounting rod 31 of the nose-pad 3 may be inserted in the second through hole 412 of the upper concave 41, and then the lower mounting rod 31' is inserted in the first through hole 411' of the lower concave 41', as shown in FIG. 9.

Figure 11:
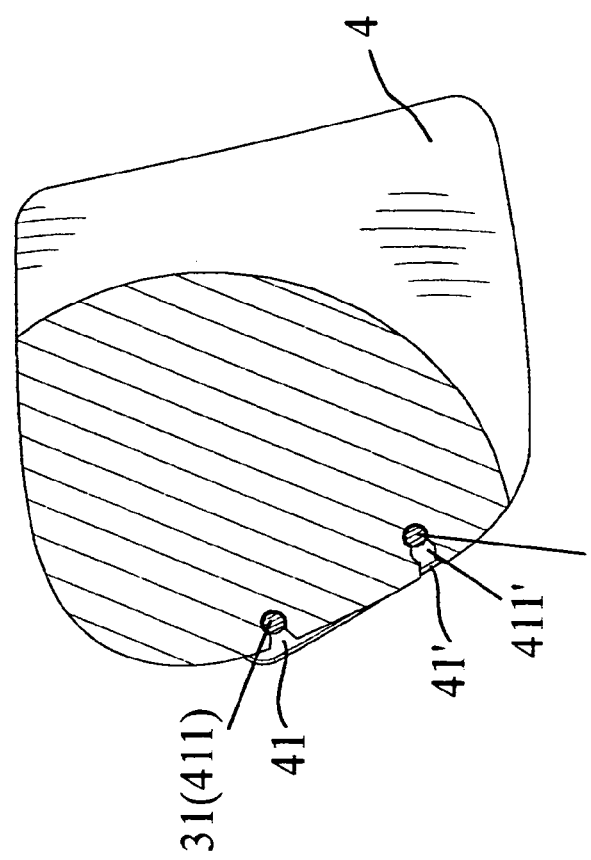
FIG. 11 is a cross sectional view taken along line B—B in FIG. 10.
Figure 10:
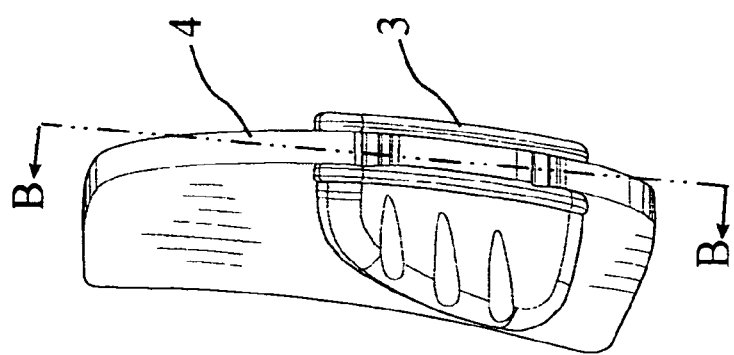
FIG. 10 is a side view of another embodiment of the position-adjustable lens and nose-pad assembly in an assembled configuration in accordance with the present invention.
Figure 12:
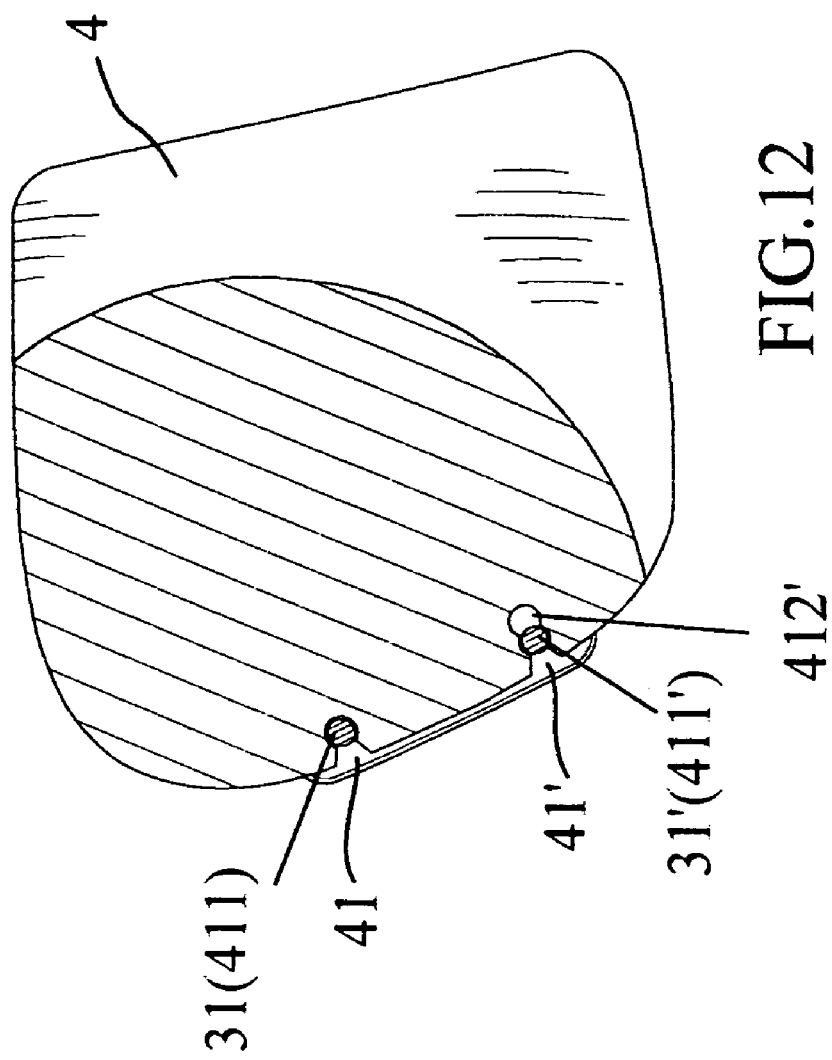
FIG. 12 is a schematic cross sectional view of another embodiment of the position-adjustable lens and nose-pad assembly in accordance with the present invention showing the nose-pad being position-adjusted.

Furthermore, in another embodiment of the position-adjustable lens and nose-pad assembly in the present invention, referring to FIGS. 10, 11 and 12, the upper concave 41 of the lens 4 may be provided with single through hole 411, and it can achieve the same effect as above-mentioned.

While the preferred embodiments of the invention have been described above, it will be recognized and understood that various modifications may be made therein and the appended claims are intended to cover all such modifications which may fall within the spirit and scope of the invention.

What is claimed is:

1. A position-adjustable lens and nose-pad assembly comprising:
    a nose pad assembly having a nose pad frame and a nose pad element joined each to the other by a pair of mounting rods, said mounting rods for maintaining displacement of said nose pad frame from said nose pad element thereby creating a hollow space therebetween having a predetermined dimension;
    a lens having a pair of concave recesses each of said concave recesses defining at least one through hole for insert therein of a respective mounting rod, said lens having a flanged section between said concave recesses having a thickness substantially equal to said predetermined dimension of said space for insert of said flanged section into said hollow space.

2. The position-adjustable lens and nose-pad assembly as recited in claim 1 wherein at least one of said concave recesses includes a pair of through holes in open communication each with respect to the other.

3. The position-adjustable lens of claim 1, wherein said pair of mounting rods of the nose pad assembly may be inserted in a first through hole of the concave recesses.

4. The position-adjustable lens of claim 1, wherein the mounting rod of said nose pad assembly may be inserted in a first through hole of the concave recesses and the lower mounting rod is inserted in a second through hole of the concave recesses.

* * * * *